United States Patent [19]

Darrieux et al.

[11] Patent Number: 5,776,383
[45] Date of Patent: Jul. 7, 1998

[54] METHOD FOR PRODUCING SHAPED PARTS MADE OF A GRAPHITIZED CARBON/CARBON COMPOSITE MATERIAL

[75] Inventors: Jean-Louis Darrieux, Saint Medard en Jalles; Jean-Marc Nicolas Pascal Donzac, Sainte Helene, both of France

[73] Assignee: Societe Nationale Industrielle et Aerospatiale, Paris Cedex, France

[21] Appl. No.: 602,420

[22] Filed: Feb. 16, 1996

[30] Foreign Application Priority Data

Feb. 17, 1995 [FR] France .................................. 95 02063

[51] Int. Cl.⁶ .................................................. C01B 31/00
[52] U.S. Cl. ......................... 264/29.1; 264/29.2; 264/29.5
[58] Field of Search .............................. 264/29.1, 29.2, 264/29.5

[56] References Cited

U.S. PATENT DOCUMENTS

| | | | |
|---|---|---|---|
| 3,971,669 | 7/1976 | Wrzesien | 264/29.2 |
| 4,490,201 | 12/1984 | Leeds | 264/29.5 |
| 5,491,000 | 2/1996 | Hocquellet | 427/113 |

FOREIGN PATENT DOCUMENTS

| | | |
|---|---|---|
| 0402915 | 12/1990 | European Pat. Off. . |
| 0558417 | 9/1993 | European Pat. Off. . |
| 2143124 | 2/1973 | France . |
| 2684097 | 5/1993 | France . |
| 1360887 | 7/1974 | United Kingdom . |

OTHER PUBLICATIONS

*Carbon*, vol. 31, No. 5, 1993, Oxford, Great Britain, pp. 731–750, XP397372, K. Christ et al., "Carbon–Fiber–Reinforced Carbon Composites Fabricated with Mesophase Pitch."

*Carbon*, vol. 32, No. 6, 1994, Great Britain, pp. 1035–1044, N. El Horr et al., "Mesophase Powders (Carbonization and Graphitization)."

*Carbon*, vol. 32, No. 1, 1994, Great Britain, pp. 61–70, K. Lafdi et al., "An Attempt to Characterize and Elaborate Anisotropic Pitches and Derived Carbon Fibers. Part II: Preparation by Separation."

French Search Report and Annex.

*Primary Examiner*—James Derrington
*Attorney, Agent, or Firm*—Greenblum & Bernstein, P.L.C.

[57] ABSTRACT

Method for producing a shaped part made of a graphitized carbon/carbon composite material in which a compound of carbon fibers is prepared impregnated with a solution of carbon precursors and then cut into sections placed in a mould subjected to a carbonization stage by means of hot unidirectional pressing, wherein, so as to prepare the compound, the fiber is subjected to a heat deoxidation and oil removal treatment followed by a softening in a bath for increasing wettability and hooking and then impregnation in a bath formed of an aqueous solution containing pitch mesophase, high-yield pitch and a binder, the required sufficient calculated amount of compound being placed in bulk in a hot constant volume pressing mould so as to accurately fill the mould at the end of pressing before carrying out said carbonization, the moulded part finally being graphitized at a high temperature. Applications include the aeronautic and spatial fields.

20 Claims, 2 Drawing Sheets

METHOD FOR PRODUCING SHAPED PARTS MADE OF A GRAPHITIZED CARBON/CARBON COMPOSITE MATERIAL

BACKGROUND OF THE INVENTION

1. Field of the Invention

The present invention concerns the production of shaped parts intended to withstand extremely high thermodynamic stresses and formed of discontinuous carbon fibers embedded in a carbon die.

These parts are particularly used in aeronautical and spatial applications so as to constitute pipes, brake disks, turbine blades, wing-tips, leading edges of wings, etc.

2. Discussion of Background Information

There are various techniques able to obtain parts of this type by the hot compression moulding of a mixture of carbon fibers and carbon precursors.

Thus, EP-A-0,402,915 describes how to mix different lengths of multidirectional carbon fibers, graphite loads and pitch mesophases so as to prepare a graphitizable and mouldable semifinished product used to produce flats parts, especially friction disks.

However, this technique is difficult to control. In particular, the stage for mingling and mixing the fibers may result in breaking the filaments, the length of the fibers being variable and between 5 and 50 mm.

Moreover, to obtain a homogeneous material requires, in particular, that delicate operations be carried out to impregnate the fiber bundles so as to obtain a homogeneous composite, that is without zones free of fibers or including occlusions.

Furthermore, EP-A-0,558,417 describes the embodiment of a mixture to be moulded in the form of sections containing the carbon fiber and a pitch mesophase, both placed in a hot pressing mould so that their longitudinal axis are perpendicular to the pressing axis. These carbon/carbon composites are only treated at a temperature of lower than 1200° C. and are not graphitizable as the treatment to which the fibers are subjected does not make this possible.

In addition, the alignment of the fibers is unidirectional and the length of usable fibers is limited by the dimensions of the pressing section.

Finally, this method results in obtaining a blank which needs to be machined, which damages the fibers and accordingly results in reducing the mechanical performances.

SUMMARY OF THE INVENTION

The object of the present invention is to offer a new technique for producing mechanical parts made of a composite material using high-performance carbon fibers densified by the hot pressing of carbon precursors, the technique being able to resolve the drawbacks mentioned above.

In particular, the invention seeks to obtain shaped parts able to be solid, complex and, in particular uneven parts with large dimensions not needing to be machined when removed from the mould and suitable for graphitization and whose material exhibits improved homogeneity and resistance, especially with regard to mechanical stresses.

To this effect, the invention concerns a method for producing shaped parts made of a graphitized carbon/carbon composite material in which a semiproduct or compound formed from a carbon fiber impregnated with an aqueous solution of carbon precursors is then cut into sections after calibration-drying, the impregnated fiber sections being placed in a mould and subjected to a carbonization stage by means of hot unidirectional pressing, wherein:

so as to prepare the compound, continuously and prior to the calibration-drying, the fiber is successively submitted to a preparatory heat deoxidation and oil removal treatment followed by a softening by impregnation in a bath containing solvents and binders so as to increase the wettability and hooking of the surface of the fiber which is then impregnated by passage in a bath formed of an aqueous solution of pitch mesophase, high-yield pitch and a binder, the required sufficient calculated amount of compound obtained being placed in bulk in a hot constant volume pressing mould so as to accurately fill the mould at the end of pressing before carrying out the carbonization, the moulded part finally being graphitized at a high temperature.

First of all, this method, by virtue of the exceptional creep-workability of the material making up the compound, is able to mould uneven parts possibly having complex and/or fine shapes, such as turbine blades.

Furthermore, the parts obtained have the desired dimensions, the mould being calculated to this effect with no additional machining being made to the parts, a simple deburring being possibly necessary on the parting lines.

According to another interesting characteristic of the parts obtained as above, the conjunction of placing in bulk in the mould impregnated fiber sections with a suitable length, possibly larger than the local section of the mould and the remarkable plasticity of the compound, results in obtaining fibrous architectures with a preferred orientation of the fibers along the surfaces but having a component with an orientation of the fibers in the pressing axis.

Moreover, according to another advantageous characteristic of these parts, their basic material possesses extremely good homogeneity, both from the macroscopic point of view and from the microscopic point of view.

In fact, the possibility of using fibers with a relatively small number of filaments and a cutting of short fiber sections, namely about several millimeters, gives the material with a reduced size grain, the term <<grain>> denoting the unit volume defined by a fiber section of the material, all the pressed and possibly interlocked grains defining the entire moulded part.

As regards the microscopic point of view, there is no single matrix zone in the composite material, that is without any fiber or exhibiting any macroporosity, the pores being extremely small.

The method lends itself extremely easily to an industrial usage as it ensures the preparation of a continuous compound and the embodiment of parts by a single hot pressing operation with the shapes and dimensions of the finished part without machining followed by a conventional graphitizing heat treatment.

In this respect, it is to be noted that the method is able to mould several parts during a given pressing and that graphitization carried out in an independent oven can be applied to a set of parts, whether the parts are similar or not.

BRIEF DESCRIPTION OF THE DRAWINGS

Other characteristics and advantages shall appear more readily from the following description of an embodiment of the method of the invention, the description being given solely by way of example and with reference to the accompanying drawings wherein.

DETAILED DESCRIPTION OF THE PREFERRED EMBODIMENTS

Figure 1:
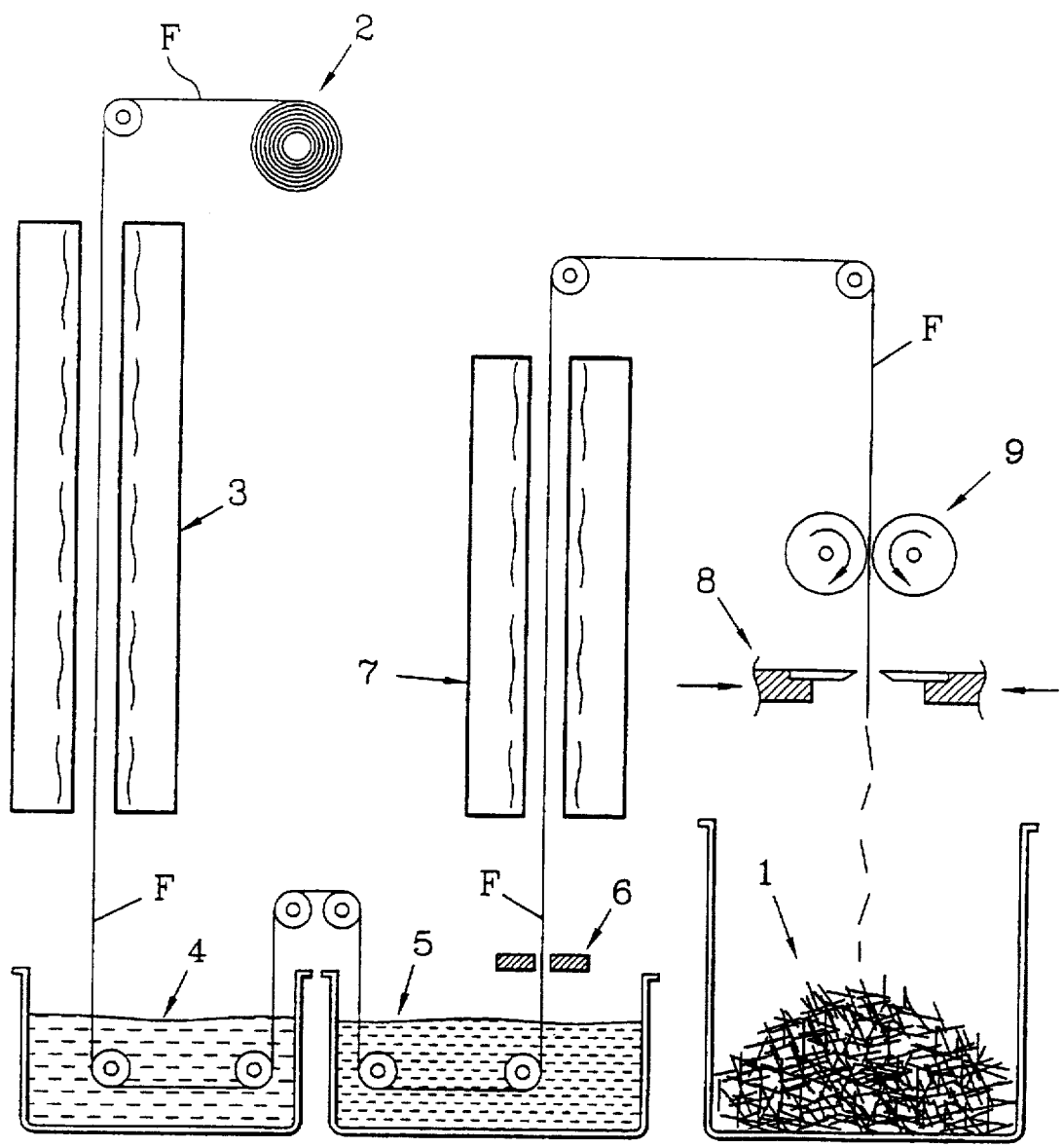
FIG. 1 is a diagram illustrating the stages for producing the compound of the method of the invention.

As shown diagrammatically in FIG. 1, the first stage of the method of the invention is the continuous production of a semiproduct or compound 1 formed of impregnated carbon fiber sections from a continuous fiber stored at a coil 2 and continuously unwound with the aid of a conventional brake reeler (not shown).

The initial carbon fiber may be a fiber comprising 500 filaments commercialized under the reference T300 by the TORAY company.

It is unwound from the coil 2 with a suitable tension by a device symbolized at 3 disposed downstream of the fiber treatment chain, return pulleys being disposed at the required locations along the path of the fiber denoted by the reference F.

In a preparatory stage, the fiber F is deoxidized and its oil removed by a conventional heat treatment in an oven symbolized at 3.

The fiber F is treated unwound in the oven under a neutral atmosphere 3 from which it comes out at ambient temperature deoxidized with its original greasing oil removed. The oven 3 may be of the type described in the document FR-A-2,684,097. For more details concerning the functioning of this oven, reference could be effectively made to this document.

After its passage in the oven 3, the fiber F is immersed in a softening bath 4 formed of an aqueous solution containing solvents and binders able to provide the surface of the fiber with the best possible wettability and hooking.

For example, the oiling solution 4 is an aqueous solution containing 0.5% in weight of polyvinyl alcohol and 0.5% by weight of polyethyleneglycol and having a pH of between 4 and 5.

After impregnation in the bath 4, the fiber undergoes an impregnation in a bath 5 formed of an aqueous solution of pitch mesophase, high-yield-pitch and a binder.

The aqueous solution preferably includes, for 100 parts in weight of water, 90 parts in weight of the pitch mesophase, 10 parts by weight of high-yield pitch and 6 parts by weight of polyvinyl alcohol, the solution having a pH of between 4 and 5.

The pitch mesophase may be of the type of the powders mentioned in the publication entitled <<Carbon, Vol. 32, N°6, pp 1035–1044, 1994>>, when the high-yield carbon pitch (more than 90%) may be of the type of the anisotropic pitches mentioned in the publication entitled <<Carbon, Vol. 32, N°1, pp 61–70, 1994>>.

At the outlet of the bath 5, the fiber F undergoes a conventional calibration pultrusion by moving continuously into a die or diaphragm 6.

At the outlet of the die 6, the fiber F moves into a drying tunnel 7.

The device 9 moves the fiber F at a continuous speed appropriate to the desired tension and during the desired dwell times in the tunnels 3, 7 and the baths 4, 5.

Downstream of the drive device 9, the fiber F is sectioned by cutting knives 8 driven at a suitable constant speed so as to have sections with the same or a variable length (from several millimeters to several tens of millimeters, for example) if it is desired to obtain a compound 1 with sections of different lengths.

The compound is then placed in bulk in a constant volume hot uniaxial pressing graphite mould. In this type of mould, in the mould closing position, that is at the end of pressing, the moulded part has the shapes and dimensions of the final part so that no machining is necessary after moulding.

This mould needs to have correct filling, that is to accurately calculate a sufficient required amount of material to be moulded to exactly fill the mould.

Figure 2:
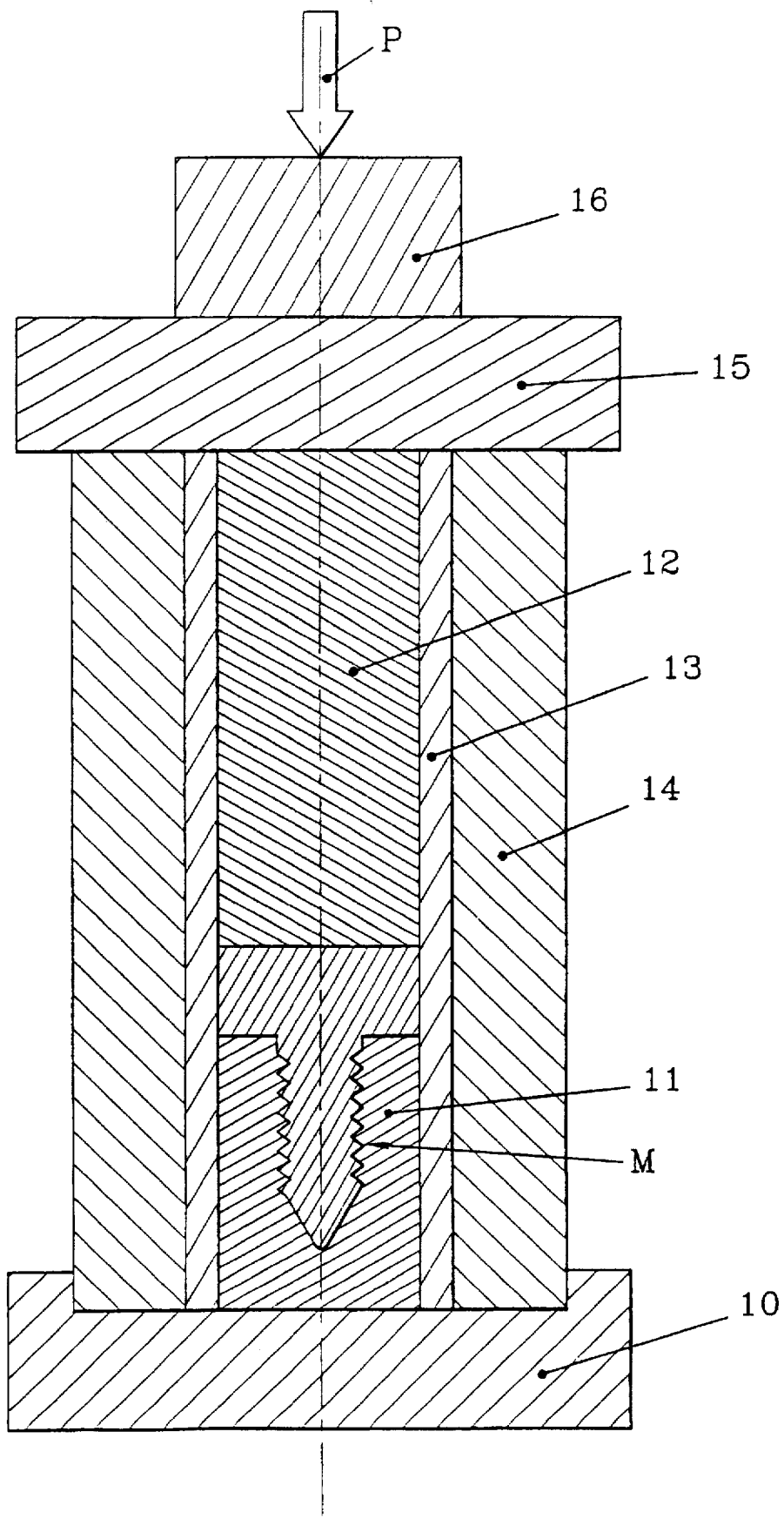
FIG. 2 is a diagrammatic axial vertical cutaway view of a unidirectional pressing mould in a closing position for embodying a hexagon head screw made of a composite material according to the method of the invention.

In accordance with the method of the invention, FIG. 2 shows the embodiment of a part M made of a carbon/carbon composite material, in this particular case a hexagon head screw, from the compound 1 in a mould of the type described above and shown in a closed position.

The mould traditionally includes a base 10, a monoblock form 11, a piston 12, a cylindrical jacket 13, a hoop 14, a stop shim 15 and a thrust stop 16 receiving the unidirectional pressing force P exerted by a hot press (not shown).

The moulding cavity defines in a mould closed position the part M with the desired dimensions, except for a slight oversizing given to the mould so as to take account of the relatively small shrinkage of the part during subsequent graphitization.

This cavity is delimited by the form 11, the jacket 13 and the piston 12.

The compound 1, embodied in accordance with the process shown in FIG. 1 and in a quantity calculated as indicated earlier to exactly fill the moulding cavity in the mould closing position, is poured in bulk into the space delimited by the form 11 and the jacket 13, the parts 12, 15 and 16 being removed.

The piston 12 is then engaged in the jacket 13, the shims 15 and 16 are put in place and a conventional hot pressing cycle is effected during which the temperature is raised to about 1200° C., the pressure P being about 15 MPa.

On removal from the mould, the part M does not require any machining, the fibers therefore keeping their essential characteristics. A simple deburring may subsequently be required on the parting lines, for example opposite to the hexagonal upper and lower edges of the head of the screw M.

By way of indication, the part M has a density of 1.5 with a volume percentage of fibers of 30%.

The remarkable creep-workability of the compound 1, provided in particular by the presence of the high-yield pitch, permits an easy complete filling of the sharpest, narrowest, most complex or winding portions or recesses of the moulding cavity. This applies to the threads of the screw M and the point.

The impregnated fiber sections comprising the compound have a given length able to be significantly larger than the section of the mould.

Figure 3A:
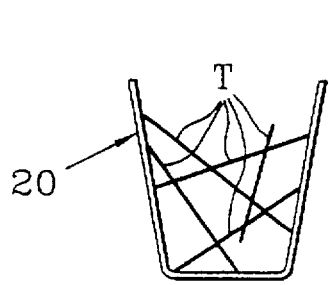
FIGS. 3a and 3b are diagrams illustrating the placing of fiber sections in a mould before and after pressing respectively.
Figure 3B:
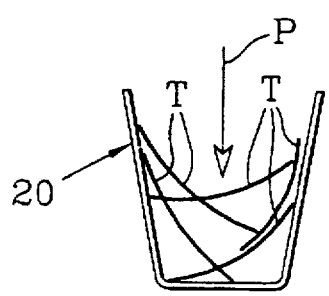

FIGS. 3a and 3a show in diagram form the general behaviour of these sections during pressing.

These figures show at 20 a moulding cavity in which several impregnated fiber sections T of the same length have been inserted and orientated in various directions. The length of the sections T is larger than the section of the mould 20 transverse to the pressing direction P, at least in the lower portion of the mould.

Applying the pressing force P tends to warp the sections T so as to be preferably aligned parallel to the walls of the mould 20 whilst nevertheless substantially keeping a directional component with orientation transverse to the pressing P. What is observed in the part M is that the fibrous reinforcements shall also take part in picking up the forces to be exerted on the part along its axis, which corresponds to the pressing axis.

As a variant and according to the type of part to be obtained, several lengths of impregnated fiber sections may be provided in the initial compound.

The size of the sections may vary by several millimeters to several tens of millimeters according to the dimensions and geometry of the part to be obtained, as well as the required mechanical properties for this part. Generally speaking, the longer the sections are, the better shall be the mechanical reinforcement. The extreme flexibility and deformability of the sections of the compound of the invention, even for small parts, make it possible to use long fibers, indeed longer than the local section of the part.

Moreover, the material of the part M is remarkably homogeneous.

From the macroscopic point of view, the size of the grains, that is the unit volume constituted by each section irrespective of its configuration with the sections generally being glued and interlocked randomly and without breaking the fiber, is reduced and can be more so when the fibers F with a reduced number of filaments are used.

From the microscopic point of view, no single matrix zone, that is without any fiber, is observed in the material. Moreover, the pores observed on the surface are small (about $5000/cm^2$) and on the whole no macroporosity is observed.

A conventional subsequent treatment for graphitizing the part M under a high temperature, possibly reaching 2400° C., thus makes it possible to obtain a part having a sufficient density to provide it with remarkable mechanical properties, especially resistance to extremely high thermodynamic stresses.

The method of the invention is therefore suitable for the production of high-performance parts made of a carbon/carbon composite material with variable shapes and dimensions and may possibly be complex and flat or uneven, such as brake disks, turbine blades, wing-tips, leading edges of wings, etc., as well as all parts subjected to friction.

The method lends itself particularly well to industrial usage as it is limited to three separate operations, the first being the continuous preparation of a compound whose calibration (length, diameter) of the impregnated fiber sections may be easily adjusted, the second being a hot pressing to the shapes of the finished part without machining, and the third a heat graphitization treatment.

For large compound quantities, operation may take place on several lines so as to have a continuous production. It is also possible to mould several parts during a given pressing and also to graphitize several parts simultaneously. All these various possibilities result in attaining significant reductions of costs.

Finally, it is to be noted that the method is applicable to any type of carbon fiber and the compositions of the impregnation baths described earlier are basically given by way of example and slight qualitative and/or quantitative modifications could be made to the extent that the same effects are for the most part observed.

We claim:

1. A method for producing a shaped part made of a graphitized carbon/carbon composite material, comprising:

a) continuously subjecting carbon fiber to heat deoxidation and oil removal treatment;

b) softening the carbon fiber by impregnation in a softening bath containing solvents and binders for increasing wettability and hooking;

c) impregnating the carbon fiber in an impregnation bath comprising an aqueous solution containing pitch mesophase, high-yield pitch and binder;

d) calibration-drying the carbon fiber;

e) cutting the carbon fiber into sections;

f) placing the sections in bulk in a hot constant volume pressing mold in a calculated amount to accurately fill the mold at the end of pressing and prior to performing carbonization;

g) subjecting the sections to carbonization by hot unidirectional pressing to form a shaped part; and h) graphizing the shaped part at a high temperature.

2. The method according to claim 1, wherein said softening bath comprises an aqueous solution containing 0.5% by weight polyvinyl alcohol, 0.5% by weight polyethyleneglycol, and has a pH of between 4 and 5.

3. The method according to claim 2, wherein said impregnation bath comprises an aqueous solution containing for each 100 parts by weight of water, 90 parts by weight of pitch mesophase, 10 parts by weight of high-yield pitch, and 6 parts by weight of polyvinyl alcohol, and having a pH of between 4 and 5.

4. The method according to claim 1, wherein said impregnation bath comprises an aqueous solution containing for each 100 parts by weight of water, 90 parts by weight of pitch mesophase, 10 parts by weight of high-yield pitch, and 6 parts by weight of polyvinyl alcohol, and having a pH of between 4 and 5.

5. The method according to claim 2, wherein the sections have a length greater than the length of the mold.

6. The method according to claim 2, wherein the sections have a length greater than the length of the mold.

7. The method according to claim 4, wherein the sections have a length greater than the length of the mold.

8. The method according to claim 1, wherein the sections comprise sections of the same length.

9. The method according to claim 2, wherein the sections comprise sections of the same length.

10. The method according to claim 4, wherein the sections comprise sections of the same length.

11. The method according to claim 1, wherein the sections comprise sections of varying lengths.

12. The method according to claim 2, wherein the sections comprise sections of varying lengths.

13. The method according to claim 4, wherein the sections comprise sections of varying lengths.

14. The method according to claim 1, wherein the graphizing is preformed at a temperature up to about 2,400° C.

15. The method according to claim 2, wherein the graphizing is preformed at a temperature up to about 2,400° C.

16. The method according to claim 4, wherein the graphizing is preformed at a temperature up to about 2,400° C.

17. The method according to claim 1, wherein the shaped part comprises a high-performance part.

18. The method according to claim 2, wherein the shaped part comprises a high-performance part.

19. The method according to claim 4, wherein the shaped part comprises a high-performance part.

20. The method according to claim 1, wherein the shaped part comprises brake disks, turbine blades, wing-tips, or leading edges of wings.

* * * * *